May 20, 1930. L. C. COLE 1,759,543
TOOL HEAD FOR RADIAL DRILLS
Filed Nov. 14, 1927 6 Sheets-Sheet 1

INVENTOR
L.C.Cole
BY
Joseph K. Schofield
ATTORNEY

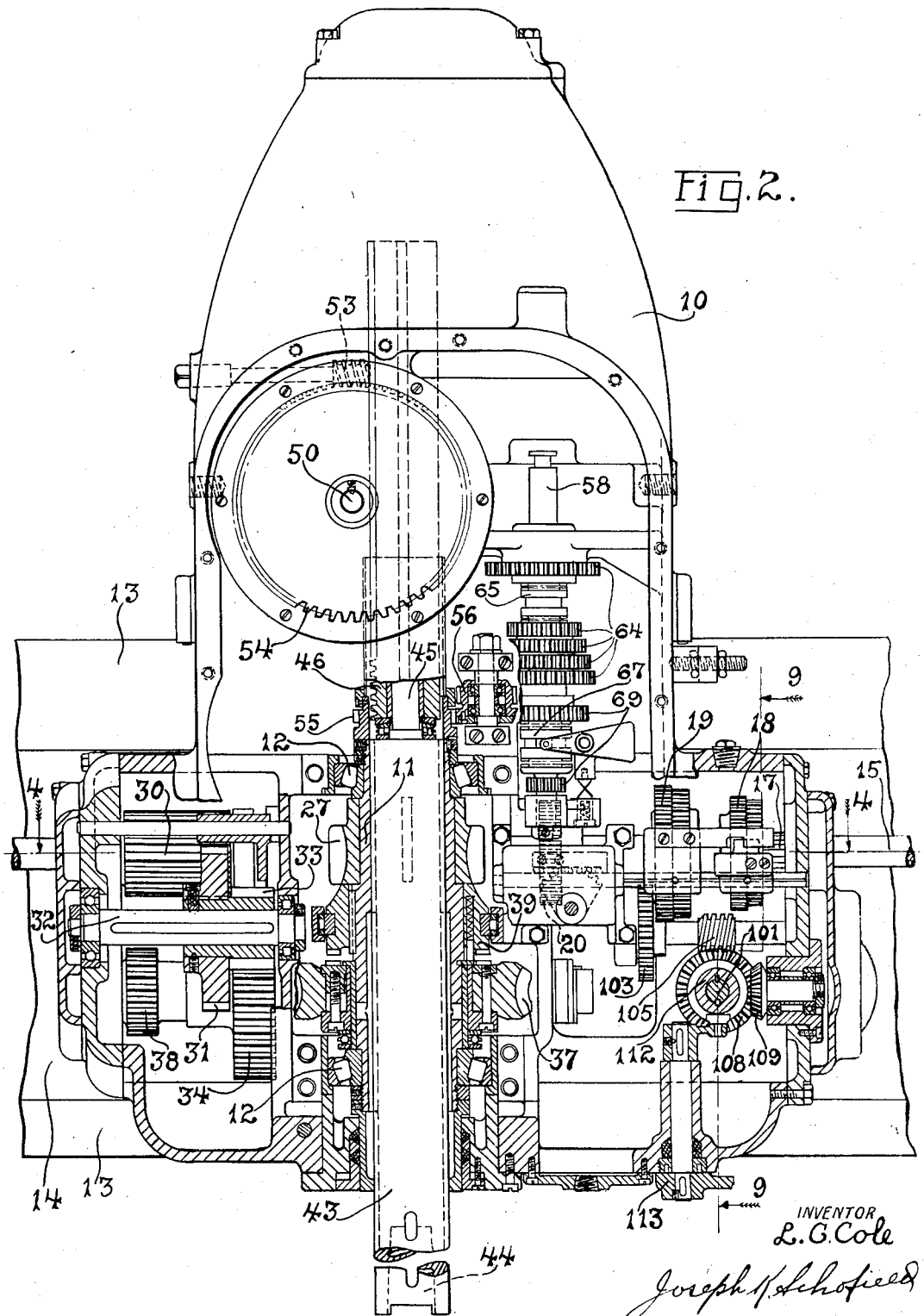

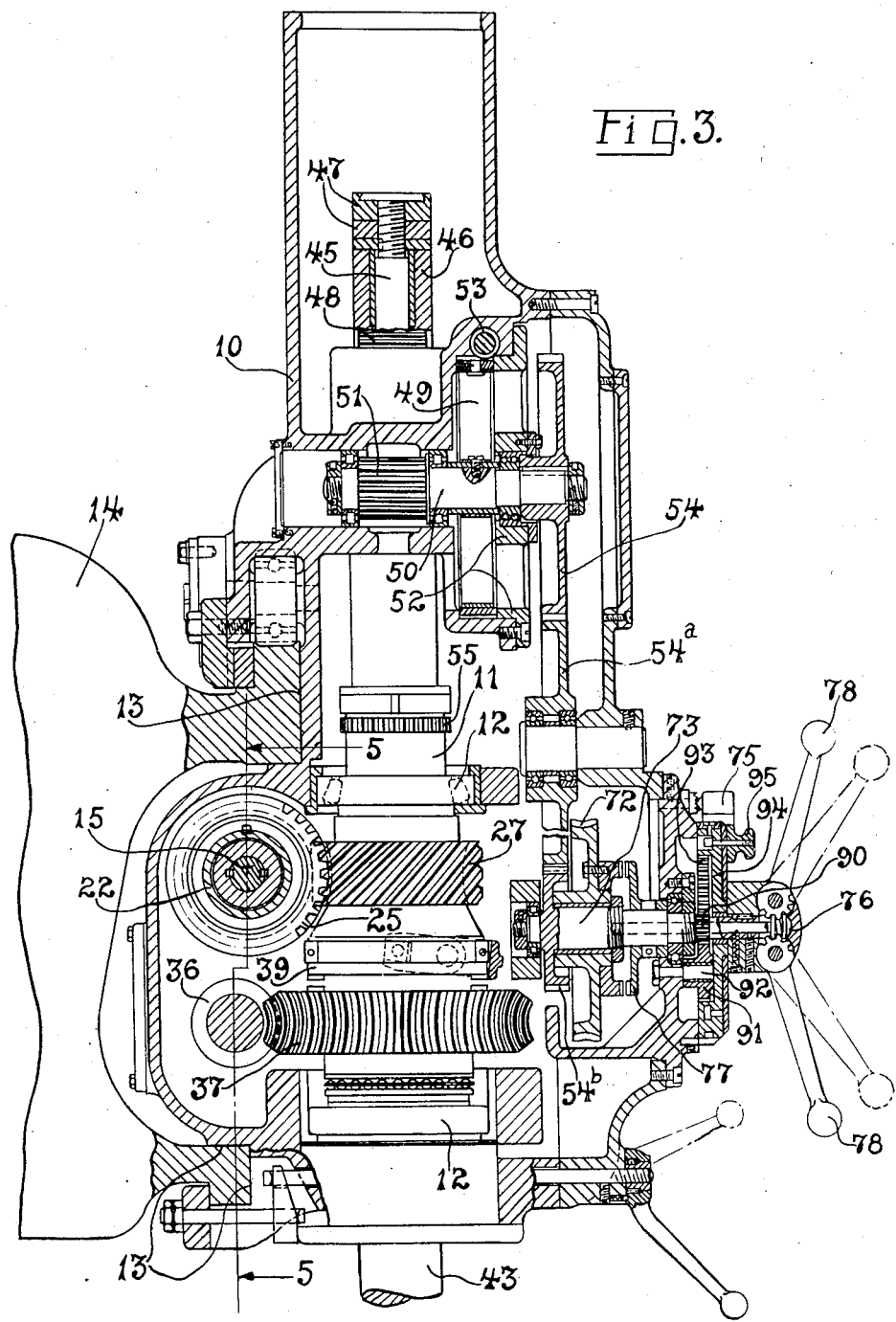

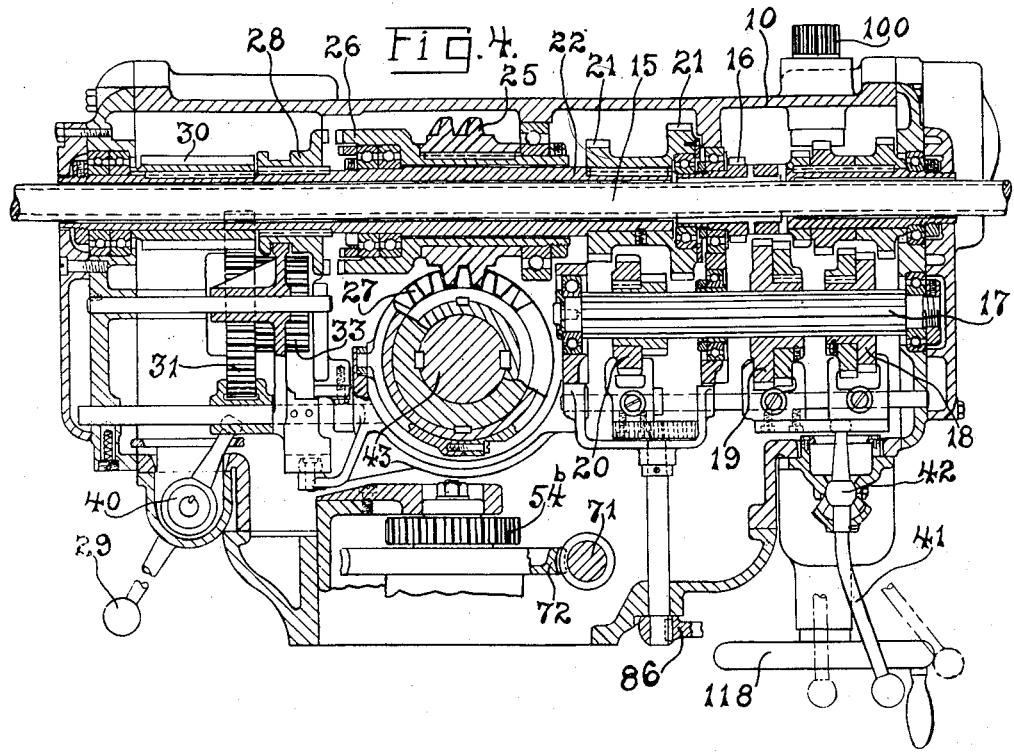
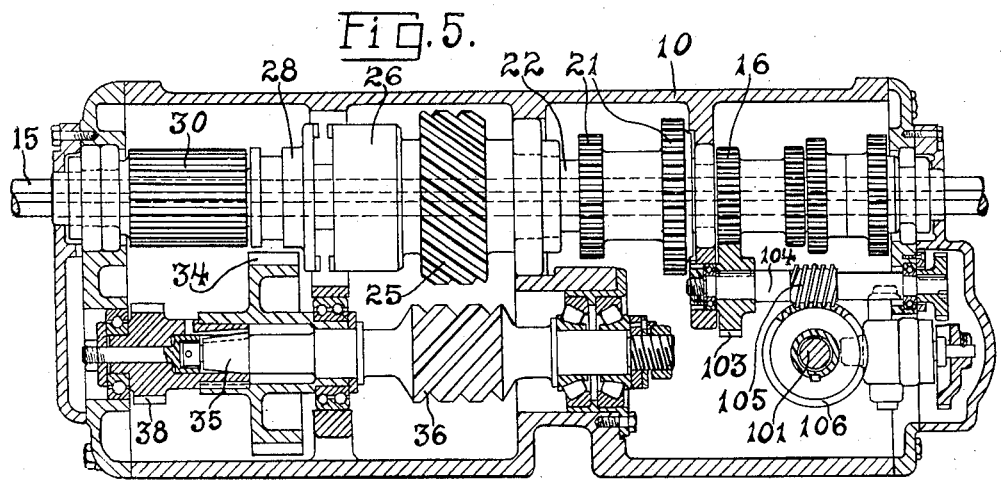

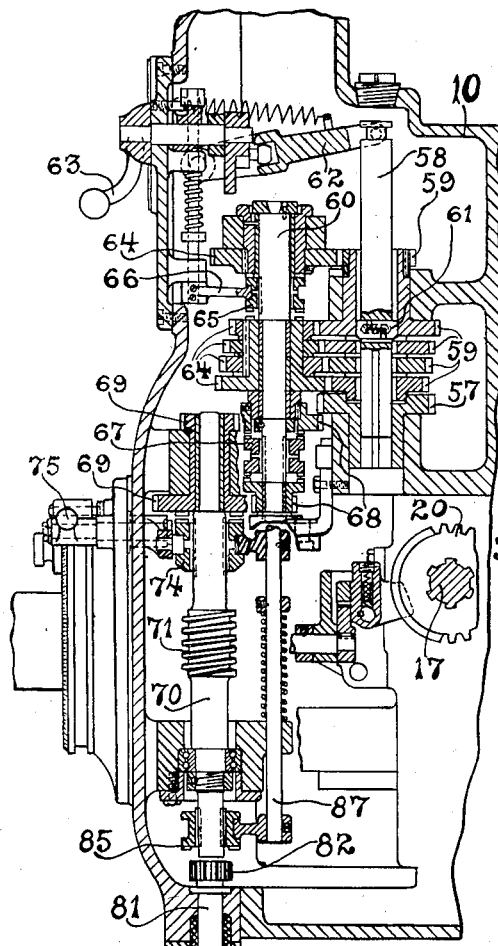
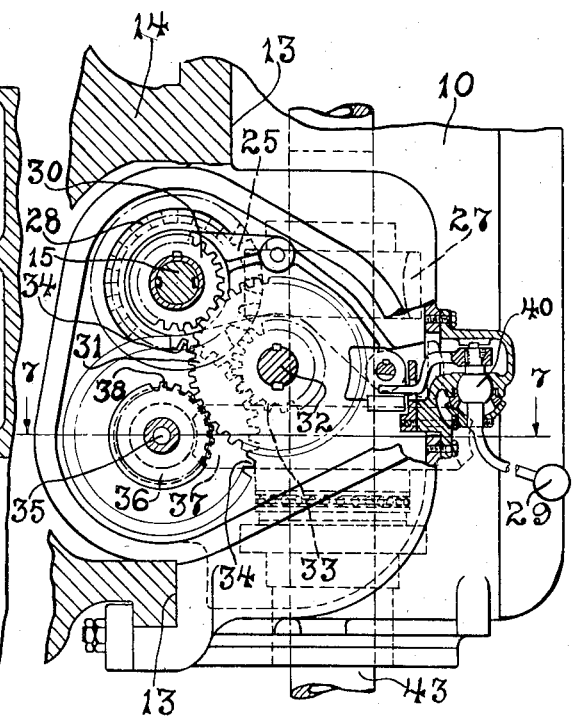
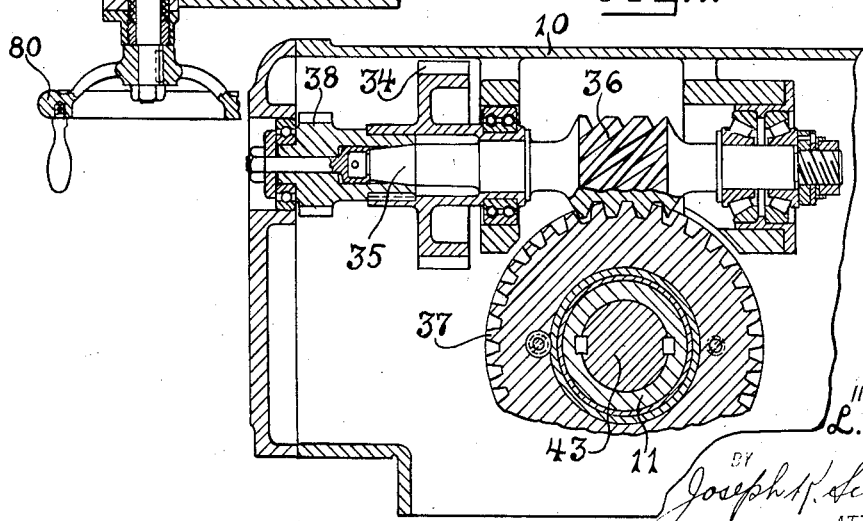

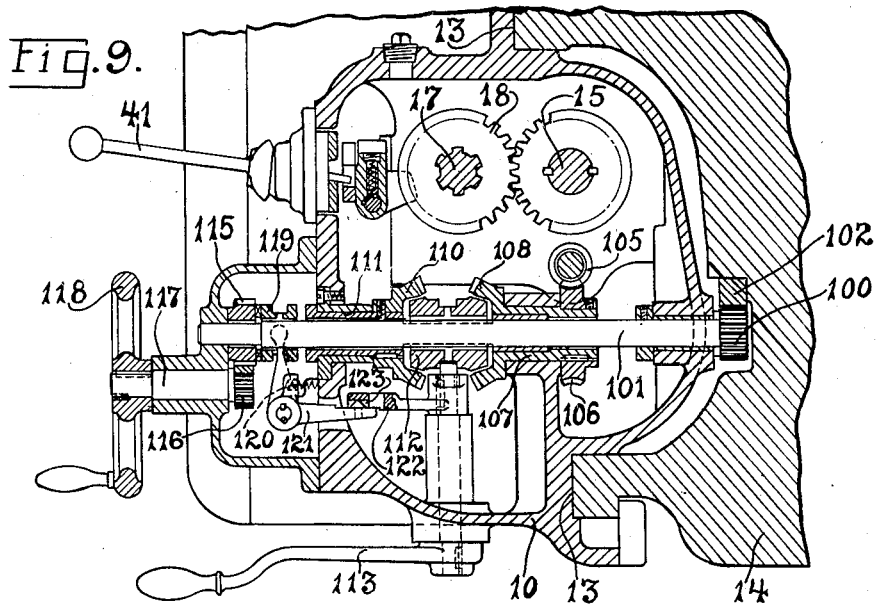
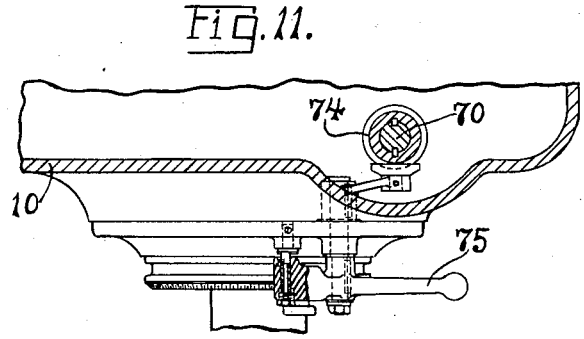
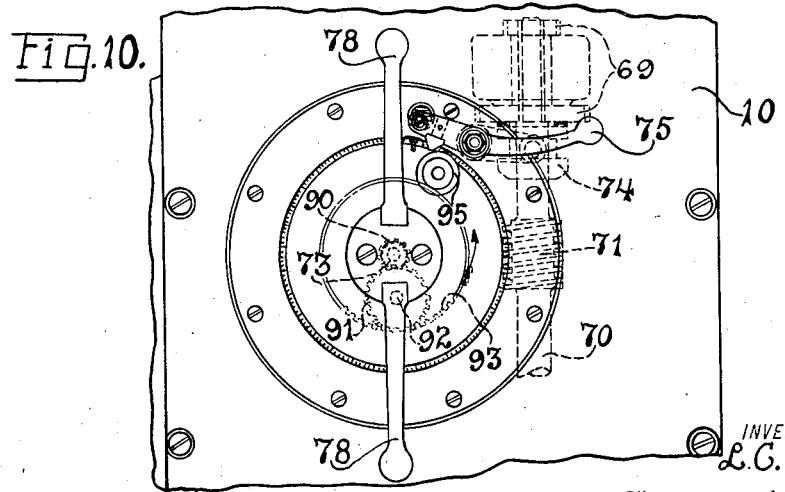

Patented May 20, 1930

1,759,543

UNITED STATES PATENT OFFICE

LYNDON C. COLE, OF HAMILTON, OHIO, ASSIGNOR, BY MESNE ASSIGNMENTS, TO GENERAL MACHINERY CORPORATION, OF HAMILTON, OHIO, A CORPORATION OF DELAWARE

TOOL HEAD FOR RADIAL DRILLS

Application filed November 14, 1927. Serial No. 233,109.

This invention relates to radial drills and in particular to drill head construction therefor.

An object of the present invention is to provide improved rotating means for the drill spindle of a radial drill, all the members of which are mounted within a drill head and whereby a plurality of different speeds may be obtained while the main driving or arm shaft of the radial drill is being rotated at constant speed.

One feature which enables me to accomplish the above named object is that the drill spindle is provided with two gears having different numbers of teeth. One of these gears is secured directly to the spindle and may be directly driven from a gear mounted on the driving or arm shaft and adapted to be driven at a plurality of speeds therefrom. The second gear on the spindle, which is adapted to be clutched thereto, may be driven at different speeds through an intermediate shaft driven from the arm shaft and by a plurality of speed change gears. By these means three different series of speeds for the spindle are obtainable by mechanism within the head while the driving shaft is rotating at a constant speed.

Another object of the invention is to provide a plurality of speed change gears within the head of a radial drill, any pair of which may be employed to rotate a sleeve surrounding the driving shaft, the sleeve being drivingly connected to the drill spindle through any one of a plurality of driving connections.

Another object of the invention is to provide a driving sleeve surrounding the arm shaft of a radial drill adapted to be rotated from the arm shaft at a plurality of different speeds, the sleeve being drivingly connected to the drill spindle through a direct gear drive or indirectly through change gear connections.

Another object of the invention is to provide clutches for connecting and disconnecting the driving gear on the driving shaft relative to its sleeve and also for connecting and disconnecting the second gear relative to the spindle.

A still further object of the invention is to provide gear shifting means for changing the driving connections and speed of the intermediate shaft within the head, thus enabling the second gear on the spindle and the spindle itself to be rotated at two different series of speeds by this intermediate shaft.

Another object of the invention is to provide improved feeding mechanism for the drill spindle driven by rotation of the spindle and enabling this spindle to be moved slowly downward at a plurality of different speeds during rotation of the drill spindle.

A still further object of the invention is to provide improved means to traverse the head along the arm in either direction by mechanism enclosed within the head and operated from the arm shaft.

With the above and other objects in view my invention consists in the features of construction and operation set forth in the following specification and illustrated in the accompanying drawings.

In the accompanying drawings annexed hereto and forming a part of this specification, I have shown my invention embodied in a heavy duty drill head for radial drills of large size, but it will be understood that the invention can be otherwise embodied and that the drawings are not to be construed as defining or limiting the scope of the invention, the claims appended to this specification being relied upon for that purpose.

In the drawings:

Fig. 2 is a front view in section taken through the center line of the spindle.

Fig. 3 is a side view in section taken upon the line 3—3 of Fig. 1.

Fig. 4 is a horizontal sectional view taken upon the line 4—4 of Fig. 2.

Fig. 5 is a vertical sectional view taken upon the line 5—5 of Fig. 3.

Fig. 6 is a side elevation partly in section of one portion of the change speed driving means for the spindle.

Fig. 7 is a horizontal sectional view taken upon line 7—7 of Fig. 6.

Fig. 8 is a side elevation in section of the feed mechanism for the spindle taken upon the broken line 8—8 of Fig. 1.

Fig. 9 is a transverse sectional view of the manual and power driven traversing mechanism for the head taken on line 9—9 of Fig. 2.

Fig. 10 is a front elevation of the spindle feed stop motion, and

Fig. 11 is a plan view partly in section of the parts shown in Fig. 10.

Figure 1:
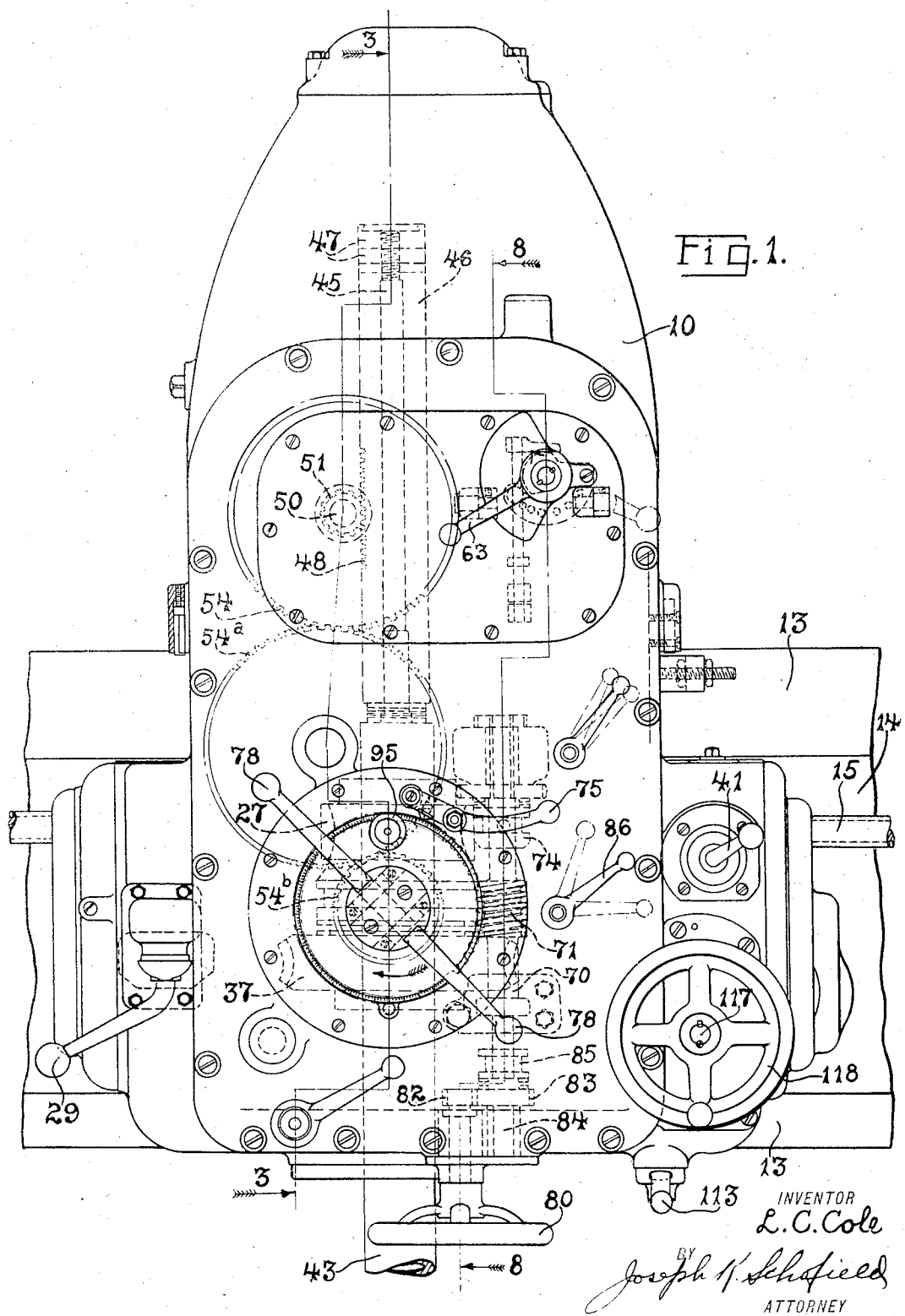
Figure 1 is a front elevation of a complete drill head made according to the present invention shown in position upon an arm of a radial drill.

In the above mentioned drawings, I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: First, a drill head having a body member slidably mounted for adjustment longitudinally along the radial arm of a drilling machine; second, a spindle rotatably mounted within the body member; third, a gear directly connected to the spindle; fourth, a second gear adapted to be clutched to the spindle; fifth, a driving shaft extending along the arm of the drilling machine; sixth, a gear rotatably mounted upon a sleeve on the driving shaft but adapted to be drivingly connected thereto so that it may be rotated with the sleeve, this gear being directly in mesh with the gear secured to the spindle; seventh, change speed mechanism within the head for rotating the gear and its sleeve; eighth, an intermediate shaft in the head drivingly connected to the sleeve on the driving or arm shaft; ninth, change gear connections between the intermediate shaft and a second gear on the spindle whereby the spindle may be rotated at a plurality of speeds from each speed of the intermediate shaft; tenth, feeding means for the spindle adapted to be manually operated or operated by the rotation of the spindle at a plurality of different speeds; and eleventh, traversing means driven from the arm shaft to position the head along the arm.

Referring more in detail to the figures of the drawings, I provide a body member 10 with a vertically disposed spindle sleeve 11 rotatably mounted therein upon suitable bearings 12, preferably roller frictionless bearings. This body member 10 is adapted to be adjusted along suitable ways 13 provided on a drill arm 14 and be suitably clamped thereto in any desired position. Extending parallelly with and horizontally along the ways of the arm is a main driving shaft 15 adapted to be constantly rotated at either one or more speeds from a suitable source of power. As this driving shaft 15 and the driving means therefor may be of any well-known or usual type, it is not thought that the means for rotating this driving shaft 15 will require description. Splined to the shaft 15 is a member 16 having a plurality of gears thereon of different numbers of teeth. Adjacent the member 16 and extending parallelly with the shaft 15 is a shaft 17 on which are mounted slidable gears, three pairs of which are shown respectively by numerals 18, 19 and 20. The pairs of gears indicated by 18 and 19 may be moved so that any one gear thereof meshes with one of the gears on the member 16. The gears on member 20 engage one or the other of a pair of gears 21 keyed to a sleeve 22 surrounding the shaft 15. From the above construction it will be seen that by suitably moving the groups of gears 18, 19 and 20 the sleeve 22 may be rotated at a plurality of different speeds relative to the shaft 15.

Rotatably mounted upon the sleeve 22 which in turn is rotatably mounted on the shaft 15 is a clutch member 26 having a gear 25 keyed thereto. The sleeve 22 rotates at all times but at different speeds with respect to the driving shaft 15 depending upon the position of gears 16, 18, 19 and 20 and the gear 25, and clutch member 26 thereon may be clutched thereto by means presently to be described. This gear 25 meshes directly with a gear 27 secured permanently to the spindle sleeve 11 so that rotation of the gear 25 with its sleeve 22 and with the driving shaft 15 will rotate the spindle sleeve 11 at a plurality of high speeds. A toothed clutch member 28 is slidably provided on the sleeve 22 adapted to engage the teeth on the face of the clutch member 26 to engage the gear 25 with the sleeve 22. By means of a hand lever 29 movable to a plurality of positions this clutch member 28 may be moved to its operative and inoperative positions into and out of engagement with the member 26.

Also on this sleeve 22 and keyed directly thereto is an elongated pinion 30 constantly in mesh with a gear 31 slidable on an intermediate shaft 32 within the head. Rotatable with this gear 31 on the intermediate shaft 32 is a pinion 33 preferably forming the hub portion of the gear 31 and which may mesh with a gear 34 on a third shaft 35 rotatable within the head 10 and disposed parallel to the driving shaft 15. This third shaft 35 is provided with a worm 36 adapted to directly engage with a worm gear 37 rotatably mounted on the spindle sleeve 11. Also mounted on the third shaft 35 is a small gear 38 adapted to mesh directly with gear 31 on the intermediate shaft 32 when the gear 31 is in one of its operative positions.

A clutch member 39 splined to the spindle sleeve 11 and adapted to be moved to engage teeth on one end face of the worm gear 37 is provided so that when the clutch 38 is engaged rotation of the worm gear 37 will rotate the spindle sleeve 11 at any one of a series of relatively low speeds. This clutch 39 is adapted to be controlled by the hand lever 29.

By means of the lever arm 29 and intermediate connections, the gear 31 and pinion 33 on the intermediate shaft 32 may be moved longitudinally along the intermediate shaft so that in one position (that shown in Fig. 2) the pinion 33 rotatable with the gear 31 meshes with the large driving gear 34 on the third shaft 35. Movement of the gear 31 and pinion 33 on the intermediate shaft 32 to an intermediate position disengages the pinion 33 from the gear 34 on the third shaft 35, and further movement of the gear 31 and pinion 33 in the same direction moves the gear 31 into mesh with the gear 38 on the third shaft. It will therefore be seen that movement of the gear 31 and pinion 33 on the intermediate shaft 32 when in its two operative positions enables the third shaft 35 to be rotated at two different speeds relative to the sleeve 22, thus enabling the spindle sleeve 11, when driven by the worm gear 37, to be rotated at two series of different speeds, the speed of which is determined by the change gear combinations 18, 19 and 20 for the sleeve 22.

Preferably the single hand lever 29 is mounted upon a ball and socket joint 40 whereby it may be moved in all directions. One direction of movement of this lever 29 moves the gear member 31—33 on the intermediate shaft 32. Other movements of the lever 29 in another plane engage the clutch 28 with the clutch member 26 on the arm shaft 15 and the clutch 39 with the second gear 37 on the spindle sleeve 11. The single hand lever 29 may therefore be moved to obtain all of the speed combinations between the sleeve 22 and the spindle sleeve 11. Also, as shown in Fig. 4, the slidable gears 18, 19 and 20 may be controlled by a single hand lever 41 mounted on a ball and socket joint 42 to individually move these gears. Within the sleeve 11 is the drill spindle 43 splined to the sleeve 11 so that it may be raised or lowered in relation thereto. At the lower end of the spindle 43 a socket 44 is provided for attachment of drills or other tools.

The drill spindle 43 at its upper end is provided with an extension 45 of smaller diameter surrounding which is a sleeve 46. This sleeve 46 is rotatably mounted upon the sleeve 11 and is held against axial movement relative to the spindle by suitable collars 47. Along one side of the sleeve 46 are provided teeth 48 of rack form. A spring counterweight 49 or tension means to counterbalance the weight of the spindle 43 and attached parts is provided suitably housed, as shown in Figs. 2 and 3, within an enclosure or casing 52 within the head 10. This spring counterweight 49 may at one end be attached directly to a shaft 50 disposed transversely within the head 10 and having a pinion 51 directly engaging the rack teeth 48 on the sleeve 46. The opposite end of the spring 49 is attached to the inside of casing 52. By rotating the casing 52 by means of a worm 53 engaging teeth cut in the periphery of the casing 52 the tension of the spring 49 forcing the spindle 43 upward may be widely varied. It will be seen from the above description that rotation of the shaft 50 and its pinion 51 will raise or lower the spindle 43 and will similarly tighten or loosen the spring 49 within the casing 52, which at all times provides an upward tension on the spindle 43.

To feed the spindle 43 during operation and to manually raise and lower the spindle means are provided to rotate the pinion 51 engaging the rack 48 surrounding the spindle 43. For that purpose the transverse shaft 50 is provided with a gear 54 directly keyed to the shaft 50 at its outer end and in mesh with an intermediate gear $54^a$. The intermediate gear $54^a$ is in mesh with a gear $54^b$ preferably formed integrally on a forwardly extending shaft 73 shown in Fig. 3. Means to directly rotate this shaft 73 to raise and lower the sleeve 11 manually and power means to slowly rotate the shaft 73 to feed the spindle 43 slowly at different speeds are provided. The power feeding means will now be described.

The spindle sleeve 11 is provided with a gear 55 keyed directly thereto which engages an idler or intermediate compound gear 56, shown in Fig. 2. The other member of this intermediate gear engages a gear 57 rotatably mounted in a bearing in the head surrounding a vertical shaft 58 to which it is splined. This mechanism is shown in Fig. 8. A series of speed change gears 59 slidably mounted upon the vertical shaft 58 provide means for rotating a second vertical shaft 60 at a plurality of speeds. The gears 59, instead of being directly keyed to the shaft 58, are adapted to rotate upon the vertical shaft 58 and are individually connected thereto by means of a sliding key 61 positioned to engage any of the gears 59 by axially moving the shaft 58 by an arm 62 controlled by hand lever 63. On the second vertical shaft 60 are a group of gears 64 engaging those on the first shaft 58. As shown clearly in Fig. 8, there is a clutch 65 provided on this second vertical shaft 60 which is adapted to be moved into and out of operative position by means of an arm 66 also controlled by the hand lever 63. This clutch 65 drivingly connects the different gears 64 to the second shaft 60. A second clutch 67 on the second vertical shaft 60 is provided to effect further changes in speed of the feeding movement by engaging one or the other of a pair of gears 68 on the second shaft meshing directly with a pair of gears 69 on a third vertical shaft 70 rotatably mounted thereon. This third shaft 70 is provided with a worm 71 directly engaging a worm wheel 72 rotatably mounted on the forwardly extending horizontal shaft 73. A clutch 74 on this shaft 70 when in operative position enables rotation of the worm wheel 72 to rotate the shaft 73 and the gear 54$^b$ mounted on its inner end as previously described.

By moving the upper clutch 65 on the second shaft 60 and the slidable shaft 58 for the nest of gears 59 adjacent thereto, a plurality of feed changes may be effected. Similarly, further changes may be effected by movement of the lower clutch 67 on the second shaft 60, the clutch 74 on the third shaft 70 being used only to start and stop operation of the mechanical feeding means for the sleeve 11, a lever 75 being provided for that purpose.

In order to effect hand movements of the sleeve 11 up or down two means are provided, one of which enables a rapid traversing movement to be effected and the other a slower or feeding movement. The means for rapidly moving the spindle comprise a hub 76 on the forward end of the shaft 73 rotatably carrying the worm wheel 72 and a clutch 77. This hub 76 is directly keyed to this shaft 73 and when the clutch 77 is in its disengaged position the hub 76 may be rotated by means of the pivotally mounted handles 78 thereon to raise or lower the sleeve 11 at a high rate of speed. Operation of these handles 78 upon their pivots within the hub 7 cause longitudinal movement of the clutch member 77 into and out of engagement with a coacting clutch member carried by the worm wheel 72. Manual rotation of the hand levers 78 will therefore rapidly rotate the gear 54$^b$ and thus raise or lower the spindle at relatively rapid rate. With the clutch 77 engaged the worm wheel 72 must be rotated to effect feeding movement of the spindle. This may be accomplished by the power driven means above describd or manually.

In order to effect a slow up or down movement of the spindle 43 by manual means, a hand wheel 80 upon a short vertical shaft 81 is provided just below the lower surface of the head 10 (see Figs. 1 and 8). On the upper end of this shaft 81 is a gear 82 in mesh with a gear 83 on a short shaft 84 in alinement with and below the third shaft 70 referred to above. A clutch 85 adjacent this shaft 84 operated by movement of a lever 86 moving a shaft 87 up and down enables the hand wheel 80 to be directly engaged or disengaged from the third shaft 70. Rotation therefore of the hand wheel 80 when its clutch is engaged enables the worm wheel 72 to be rotated in either direction by hand.

A depth gage or feed stop means to disengage the power feed for the spindle 43 at any point in its movement is provided which preferably is associated with the forwardly extending shaft 73. Gear teeth 90 cut into an intermediate portion of this shaft 73 forming a pinion engage teeth on an intermediate gear 91. This gear 91 is rotatably mounted upon a fixed stud 92 and engages the teeth of an internal gear 93 formed on a dial supporting member 94 rotatably mounted on the shaft 73. A knob 95 on this supporting member 94 forms a knock-off for the feed by engaging an extension of the hand lever 75 to actuate the clutch 74 on the worm shaft 70. This stops further rotation of the worm 71 and consequently movement of the spindle 43. By adjusting the knob 95 and its dial about the supporting member 94 and clamping it in adjusted position a predetermined and limited downward movement of the spindle 43 can be imparted.

In order to traverse the head 10 along the ways 13 of the arm 14 means are provided to rotate a pinion 100 on the rear of a horizontal shaft 101 extending through the head 10 which engages a rack 102 secured horizontally in the arm 14. In order to rotate this pinion 100 from the arm shaft 15, a gear 103 on a shaft 104 within the head engages one of the change gears on the sleeve 16. Also on this shaft 104 is a worm 105 meshing with a worm wheel 106 on a sleeve 107 surrounding the shaft 101. Rotation of this worm wheel 106 rotates a bevel gear 108 formed on the forward end of this sleeve 107 which in turn is in mesh with an intermediate bevel gear 109 driving a bevel gear 110 on the rear end of a sleeve 111 opposed to the first sleeve 107. Disposed between these two opposed sleeves 107 and 111 is a clutch member 112 splined to the shaft 101 and adapted to frictionally engage conical surfaces on the adjacent ends of either of the sleeves 107 or 111. A lever 113 has an extension engaging a groove in the clutch member 112 which enables this clutch member to be engaged frictionally with either of the sleeves 107 or 111 by oscillation of the lever 113. Sleeves 107 and 111 through the bevel gears 108 and 110 are driven in opposite directions. It will be seen, therefore, that with the driving connection for the shaft 101 frictionally engaged with one or the other of the sleeves 107 or 111 in engagement with the clutch member 112, the pinion 100 may be rotated in either direction.

In order to rotate the pinion 100 manually to traverse or adjust the head 10 along the ways 13 a gear 115 is rotatably mounted upon the forward end of the shaft 101 in mesh with a small gear 116 on the rear of a short shaft 117 having a hand wheel 118 at its forward end. A clutch 119 adjacent the gear 115 on the rearwardly extending shaft and splined thereto provides means for rotating the shaft 101 and its pinion 100 by rotation of the hand wheel 118 when the clutch 119 is engaged. With the clutch 119 in operative position and with the frictional clutch 112 in neutral position, the pinion 100 may be rotated manually in either direction by means of the hand wheel 118. As shown clearly in Fig. 9 the clutch 119 for engaging the gear 115 to manually traverse the head 10 and the double friction cone clutch 112 are operatively tied together so that when the frictional clutch 112 is in its mid or neutral position the clutch 119 at the forward end of the shaft 101 is in operative position and whenever the friction clutch 112 is moved to either of its operative positions the clutch 119 for the gear 115 is moved to its inoperative position. Normally a spring 120 pressing against a short lever on an oscillating arm 121, one end of which engages the clutch 119, forces the clutch 119 for manual operation of the shaft 101 to its engaged position. An arm 122 oscillated by the lever 113 for operating the friction clutch 112 is provided with cam surfaces 123 adapted to engage an arm on the member 121 for operating the clutch 119. Movement of the hand lever 113 to either operative position therefore will oscillate the arm 121 due to its engagement with the cam surfaces to throw the clutch 119 out of operative position.

What I claim is:

1. A drill head for radial drills comprising in combination, a body member, a spindle rotatably mounted therein, a driving shaft extending through the body member at right angles to said spindle, a gear rotatably mounted on said shaft, driving connections between said shaft and gear, a gear directly secured to said spindle and meshing with said first mentioned gear, a second gear on said spindle rotatably mounted thereon, change speed driving connections from said shaft to said second gear to rotate said second gear at different speeds relative to the shaft, and clutches for connecting said rotatably mounted gears to the shaft and spindle respectively whereby said spindle may be rotated from either of said gears on said spindle.

2. A drill head for radial drills comprising in combination, a body member, a spindle rotatably mounted therein, a driving shaft extending through the body member at right angles to said spindle, a driving gear splined to said shaft, a sleeve rotatably mounted on said shaft, a plurality of driving connections between said driving gear and sleeve, a gear rotatably mounted on said sleeve and adapted to be clutched thereto, a gear fixed on said spindle engaging said gear mounted on said sleeve, a second gear on said spindle adapted to be clutched thereto, and change gear connections between said sleeve and said second gear on said spindle, whereby said spindle may be rotated at different speeds by each of said gears on said spindle while said shaft is rotated at a fixed speed.

In testimony whereof, I hereto affix my signature.

LYNDON C. COLE.